United States Patent [19]
Goes et al.

[11] 3,747,953
[45] July 24, 1973

[54] SAFETY DEVICE FOR VEHICLE OCCUPANTS

[75] Inventors: Friedrich Goes, Wolfsburg; Ulrich Seiffert; Dieter Hinzmann, both of Braunschweig; Gunnar Borenius, Fallersleben, all of Germany

[73] Assignee: Volkswagenwerk Aktiengesellschaft, Wolfsburg, Germany

[22] Filed: Nov. 1, 1971

[21] Appl. No.: 194,717

[30] Foreign Application Priority Data
Nov. 14, 1970 Germany.................. P 20 56 101.7

[52] U.S. Cl. ............ 280/150 AB, 98/2.01, 102/39, 138/40, 222/3
[51] Int. Cl. .......................................... B60r 21/08
[58] Field of Search ............... 280/150 AB; 23/281; 98/2.01; 138/40; 222/3, 4, 5

[56] References Cited
UNITED STATES PATENTS
3,622,176  11/1971  Byer........................... 280/150 AB
3,638,964  2/1972  Chute.......................... 280/150 AB

FOREIGN PATENTS OR APPLICATIONS
896,312  10/1953  Germany...................... 280/150 AB Primary Examiner—Kenneth H. Betts
Assistant Examiner—John P. Silverstrim
Attorney—Granville M. Brumbaugh, Ronald B. Hildreth et al.

[57] ABSTRACT

A safety device for preventing injury to vehicle occupants upon the occurrence of a collision. The device includes an inflatable bag, a source of gas for rapidly inflating the bag, a triggering mechanism for actuating the gas source and an exhaust vent in communication with the bag interior for venting inflation gases from the bag in a controlled manner. Venting may be concurrent with the inflation process, or may be delayed by use of a valve openable at a predetermined pressure or by initially sealing the vent inlet with a combustible, solid fuel element that allows gas to escape through the vent after a period of combustion. The same fuel element also constitutes the gas source of the device.

6 Claims, 4 Drawing Figures

SAFETY DEVICE FOR VEHICLE OCCUPANTS

BACKGROUND OF THE INVENTION

This invention relates generally to safety devices for protecting the occupants of vehicles against injuries due to collisions, and particularly concerns a vehicular safety device of this type in which a rapidly inflatable bag is utilized to prevent an occupant from being thrown against the vehicle structure.

Various forms of inflatable bag safety devices of the kind referred to have been developed in the past. West German patent No. 1,264,275, for example, describes one such prior art device. However, these devices have not proven to be entirely satisfactory, chiefly because of the relatively uncontrolled manner in which the bags are inflated and the resulting lack of a dampened, prolonged cushioning action at the time of and following the initial collision. Such devices are therefore especially ineffectual in preventing injuries from secondary accidents, which often accompany overturning or multiple-vehicle chain reaction collisions and which require prolonged protection for the occupant.

Bursting of the bags upon impact, with consequent release of noxious or even toxic gases to the vehicle interior, is also a problem with the foregoing prior art equipment. Efforts directed toward overcoming this deficiency have included the provision of pressure equalizing chambers in conjunction with the impact-absorbing bag, as in the system disclosed in West German patent No. 1,280,072, but this approach fails to provide cushioning action of the nature or duration required for full occupant safety.

SUMMARY OF THE INVENTION

It is an object of the invention, therefore, to provide an impact-absorbing safety device for vehicle occupants which will fully absorb the initial impact of an occupant upon the occurrence of a collision and thereafter will continue to cushion the occupant for a prolonged period to protect him against injuries from secondary accidents.

Another object of the invention is to provide an inflatable safety device for use in vehicles that will inflate very rapidly following a collision to prevent an occupant from being thrown against the vehicle structure and which subsequently will collapse in a slow, controlled manner to provide a sustained dampened cushioning effect on the occupant.

A further object of the invention is to provide a safety device of the kind described in which the inflatable bag is protected against bursting on impact of the occupant therewith and in which noxious gases contained within the bag are vented to the exterior of the vehicle.

These objects, together with other objects and advantages that will become apparent hereinafter, are achieved, in accordance with the invention, by a vehicular safety device which includes an inflatable bag, a source of gas for rapidly inflating the bag, a collision sensing device for triggering the gas source when a collision occurs and a provision for controllably venting the bag either concurrently with or immediately following the impact of an occupant against the bag. Such venting of the inflation gases permits the bag to absorb the shock of impact in a gradual manner and thereby provide a softer, less resilient surface for receiving the occupant. It also arrests the subsequent collapse of the bag so as to afford prolonged protection against injuries resulting from secondary accidents. In addition, by relieving overpressure within the bag, venting greatly reduces the likelihood of the bag bursting when an occupant is thrown against it. As a further advantage, the inflation gases, which may be noxious or perhaps even toxic depending on the gas source used, are prevented from reaching occupied areas of the vehicle, but are instead discharged to the vehicle exterior.

In one embodiment of the invention, the venting structure is equipped with a normally closed valve, which opens upon the bag pressure reaching a predetermined minimum. Alternatively, the vent may simply be left open at all times. In either case, the bag is very rapidly filled immediatey after a collision, and then slowly collapses as the gases escape from the bag.

According to another embodiment, a solid fuel element of the type which generates gas upon combustion is positioned in sealing relation across the vent inlet. Gas escape from the bag is therefore prevented by the fuel element until a sufficient amount of the element has been burned away to clear the inlet. The time required for the vent to become clear, and hence for venting to begin, may be controlled by varying the thickness of the portion of the fuel element overlying the vent inlet.

BRIEF DESCRIPTION OF THE DRAWINGS

For a better understanding of the invention, reference may be made to the following description of exemplary embodiments, taken in conjunction with the figures of the accompanying drawings, in which.

DESCRIPTION OF EXEMPLARY EMBODIMENTS

Figure 1:
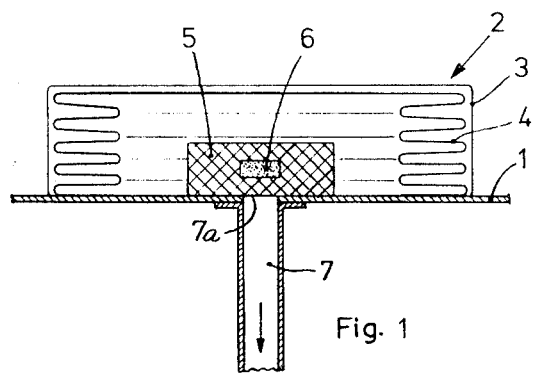
FIG. 1 is a cross sectional view of an embodiment of a safety device constructed in accordance with the invention, showing one arrangement for venting the impact bag.

As illustrated in FIG. 1, a representative embodiment of the impact-cushioning safety device 2 of the invention is adapted to be mounted on any suitable supporting surface 1 of a vehicle. In land vehicles the supporting surface 1 might constitute, for example, the dashboard, roof, seat backs or doors of the vehicle, while in aircraft the surface 1 could be constituted by appropriate parts of the seats, fuselage, partitions or the like. The safety device 2 may of course be installed in other types of vehicles, and at locations other than those referred to above.

The safety device 2, as depicted in FIG. 1, includes a protective, frangible housing 3 which encloses an inflatable bag 4, a solid fuel element 5 and a powder-type primer 6. Upon the occurrence of a collision, the primer 6 is triggered by a collision sensing device (not shown) of conventional design, thereby igniting the fuel element 5. Once ignited, the element 5 generates gas extremely rapidly, inflating the bag 4 and rupturing the housing 3.

Any one of several techniques, electrical, mechanical or pyrotechnical, may be employed to ignite the fuel element 5. For instance, the powder primer 6 could be replaced by a mechanically or electrically actuated detonator. Similarly, the invention is not limited to the use of a solid fuel which releases gases upon combustion, but may instead utilize other sources of inflation gases, such as, for example, a pressurized gas bottle.

As noted, it is a feature of the invention that the safety device 2 also includes a provision for venting some of the inflation gases from the impact bag 4. Various arrangements for accomplishing this are depicted in FIGS. 1 to 4, each of which includes a vent duct 7 that communicates at one end 7a with the interior of the bag 4 and at the other end to the vehicle exterior.

According to the invention, the duct 7 may or may not be closed off during the initial stage of the inflation process. Hence, in the embodiment pictured in FIG. 2, the duct 7 is left open at all times to provide continuous venting of the bag. The gas generating element 5 is located in surrounding relation to the duct 7, with the bag 4 extending over the element 5 and a portion of the duct 7 to form a completely sealed envelope except for the vent duct. Since during combustion the fuel element liberates a great deal more gas than can escape through the duct 7, the bag 4 will be inflated sufficiently to protect the occupant against being thrown against the vehicle structure, notwithstanding that the duct is always open. Concurrent inflating and venting of the bag in this fashion allows the bag to absorb the shock of the initial impact by the occupant gradually. This gives a softer, less resilient, cushioning effect in response to the primary collision, while also affording sustained protection against secondary accidents as well.

The venting arrangement illustrated in FIG. 1, on the other hand, at first seals the duct 7 against gas flow by positioning the fuel element 5 across its inner end 7a. No gas can escape from the bag 4, therefore, until enough of the fuel element has been burned away to clear the inlet to duct. Preferably this would occur shortly after the occupant first contacts the inflated bag 4 following a collision, although the portion of the element 5 overlying the inner end 7a of the duct may be shaped and sized so as to clear the opening at a different time.

With the FIG. 1 configuration, the gas formed when the fuel element 5 is first ignited is utilized solely to achieve prompt inflation of the bag 4. Then after some period of combustion and inflation, the vent duct 7 will become clear and venting of the inflation gases will begin. This combines maximum impact protection at the first collision, continued protection against secondary accidents, and a dampened, yielding cushioning action for greater occupant safety.

Figure 2:
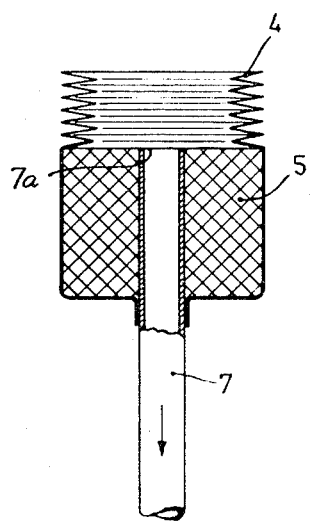
FIGS. 2, 3 and 4 are cross sectional views of other venting arrangements according to the invention.
Figure 3:
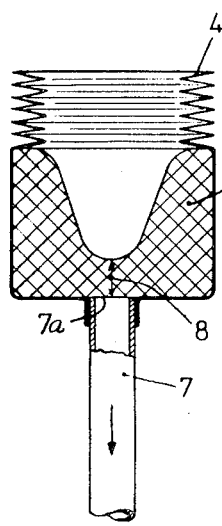

FIG. 3 depicts a venting arrangement incorporating features of both the FIG. 1 and the FIG. 2 embodiments, while adding still other features. The fuel element 5 originally blocks the vent duct 7, as in FIG. 1, but is grooved or hollowed out on the side away from the duct to provide a portion 8 of thinner cross section adjacent to the inlet end 7a of the duct. So shaped, the element 5 will burn clear of the inlet end 7a sooner than in the FIG. 1 arrangement, with the result that venting will begin at an earlier time in the inflation process. It will be appreciated that by varying the thickness of the portion 8 the time at which venting commences can be controlled. Inflation and collapse of the bag 4 will be much the same as with the embodiment of FIG. 1.

Figure 4:
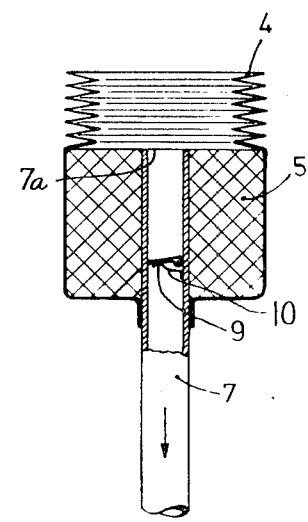

The arrangement represented in FIG. 4 is generally similar to that of FIG. 2, except that a valve 9 is provided in the vent duct 7. The valve 9 is normally closed, and may be of the type including a spring member 10 to urge it to the closed position. As the pressure within the bag 4 builds up, the valve 9 will open allowing gas to escape through the duct 7. Again, a gradual collapse of the bag is provided, with accompanying slower absorbtion of impact forces for less rigid support of the occupant and sustained protection against subsequent injuries.

Any one of the venting arrangements portrayed in FIGS. 2, 3 and 4 may be employed with a frangible, protective housing 3 (see FIG. 1), and of course may be mounted in any convenient manner and in any suitable location within a vehicle.

It is another feature of the invention that not only is improved protection afforded vehicle occupants against injury from both primary and secondary accidents, but at the same time failure of the safety device due to the bag bursting under the shock of an occupant being thrown against it is substantially eliminated. Since the inflation gases are vented either concurrently with or immediately after the first contact of the occupant with the bag, pressure relief is provided at the most crucial time insofar as the buildup of internal pressure beyond the bursting strength of the bag is concerned. Hence, there is little likelihood that a bag will burst in the midst of an accident due to overpressure.

Additionally, the invention provides the further feature of venting the inflation gases to the vehicle exterior. This is particularly advantageous inasmuch as the gases released by solid fuels, and other otherwise desirable gas sources as well, are often noxious and sometimes even toxic in character. It is important, therefore, that they not be permitted to reach occupied areas of the vehicle. The invention prevents this from occurring in two ways; one, by diminishing the probability of the impact bag rupturing during an accident and, two, by venting the inflation gases to an exterior discharge.

It will be understood by those skilled in the art that the above-described embodiments are intended to be merely exemplary, in that they are susceptible of modification and variation without departing from the inventive concepts disclosed. All such modifications and variations, therefore, are included within the spirit and scope of the invention as defined in the appended claims.

We claim:

1. A safety device for protecting vehicle occupants against injury resulting from collisions, comprising:
   a. an inflatable bag adapted to absorb the impact of an occupant when the bag is inflated;
   b. a solid fuel element adapted to generate gas for inflating the bag upon ignition of the fuel element;
   c. means for igniting the solid fuel element upon the occurrence of a collision; and
   d. means defining a vent, having an inlet end in communication with the bag interior and an outlet end, for controllably venting at least a portion of the inflation gases from the bag in such a way as to allow the bag to be rapidly inflated following a collision and thereafter to gradually collapse to provide a dampened cushioning action to protect the occupant during the collision and to afford continued protection for the occupant against injury from secondary accidents, the initiation of the gradual collapse being controlled by placement of the solid fuel element in sealing relation to the inlet end of the vent to prevent gas flow through the vent until the combustion of at least a portion of the solid fuel element has occurred.

2. A safety device according to claim 1 wherein:
the solid fuel element is located in overlying relation to the inlet end of the vent; and
the portion of the fuel element overlying the inlet end is sized to allow the escape of gas therethrough after a predetermined time of combustion and inflation.

3. A safety device according to claim 2 wherein:
the solid fuel element is hollowed out on the side thereof away from the vent inlet end so that the portion thereof overlying the vent inlet end is of reduced cross sectional thickness.

4. A safety device according to claim 1 wherein:
the solid fuel element is disposed across the inlet end of the vent in sealing relation thereto, whereby gas flow through the vent is prevented by the fuel element until the combustion of at least a portion thereof.

5. A safety device according to claim 1 further comprising:
a frangible housing enclosing the bag and the gas source defining means, the housing being rupturable by the bag upon the inflation thereof.

6. A safety device according to claim 1 in which the outlet end of the vent defining means discharges the gas to the exterior of the vehicle.

* * * * *